United States Patent
Ankisettipalli et al.

(10) Patent No.: US 11,275,894 B2
(45) Date of Patent: *Mar. 15, 2022

(54) COGNITIVE ENTERPRISE SYSTEM

(71) Applicant: SAP SE, Walldorf (DE)

(72) Inventors: Anil Babu Ankisettipalli, Sunnyvale, CA (US); Karthik Uppuluri, Mountain View, CA (US); Frank Blechschmidt, Mountain View, CA (US)

(73) Assignee: SAP SE, Walldorf (DE)

( * ) Notice: Subject to any disclaimer, the term of this patent is extended or adjusted under 35 U.S.C. 154(b) by 333 days.

This patent is subject to a terminal disclaimer.

(21) Appl. No.: 16/506,466

(22) Filed: Jul. 9, 2019

(65) Prior Publication Data

US 2019/0332956 A1    Oct. 31, 2019

Related U.S. Application Data

(63) Continuation of application No. 15/451,912, filed on Mar. 7, 2017, now Pat. No. 10,380,489.

(Continued)

(51) Int. Cl.
  *G06F 16/90* (2019.01)
  *G06F 40/237* (2020.01)
  (Continued)

(52) U.S. Cl.
  CPC ........ *G06F 40/237* (2020.01); *G06F 16/3329* (2019.01); *G06F 16/9024* (2019.01);
  (Continued)

(58) Field of Classification Search
  CPC ............ G06F 16/9024; G06F 16/9535; G06F 16/2455; G06F 16/282; G06F 16/3329;
  (Continued)

(56) References Cited

U.S. PATENT DOCUMENTS 8,015,143 B2    9/2011  Estes
8,914,391 B2 *  12/2014  Iwama .............. G06F 16/24542
                                                      707/758

(Continued)

OTHER PUBLICATIONS

"U.S. Appl. No. 15/451,912, Non Final Office Action dated Mar. 1, 2019", 11 pgs.

(Continued)

*Primary Examiner* — Merilyn P Nguyen
(74) *Attorney, Agent, or Firm* — Schwegman Lundberg & Woessner, P.A.

(57) ABSTRACT

Systems and methods are provided for receiving a query created by a user, receiving output data of at least one function to retrieve data related to the query and analyzing the output data of the at least one function to retrieve data related to the query. The systems and methods further provide for generating at least one dynamic knowledge graph associated with the output data of the at least one function, wherein the at least one dynamic knowledge graph comprises data from the output data of the at least one function and indicates relationships between the data, analyzing the at least one dynamic knowledge graph to determine data relevant to the query generated by the user, and generating a response to the query based on the data relevant in the at least one dynamic knowledge graph.

20 Claims, 10 Drawing Sheets

Related U.S. Application Data

(60) Provisional application No. 62/424,952, filed on Nov. 21, 2016.

(51) Int. Cl.

| | | |
|---|---|---|
| *G06F 16/901* | (2019.01) | |
| *G06F 16/9038* | (2019.01) | |
| *G06F 16/9535* | (2019.01) | |
| *G06F 16/332* | (2019.01) | |
| *G06F 40/30* | (2020.01) | |
| *G06N 5/02* | (2006.01) | |
| *G06N 5/04* | (2006.01) | |
| *G06Q 10/06* | (2012.01) | |

(52) U.S. Cl.
CPC ...... *G06F 16/9038* (2019.01); *G06F 16/9535* (2019.01); *G06F 40/30* (2020.01); *G06N 5/022* (2013.01); *G06N 5/043* (2013.01); *G06Q 10/0631* (2013.01)

(58) Field of Classification Search
CPC ............... G06F 16/9038; G06F 16/532; G06F 16/90335; G06F 16/904; G06N 5/022; G06N 5/043; G06N 5/02; G06Q 10/0631
See application file for complete search history.

(56) References Cited

U.S. PATENT DOCUMENTS

| | | | |
|---|---|---|---|
| 9,165,087 B2 * | 10/2015 | Gross | G06F 16/9024 |
| 9,727,648 B2 * | 8/2017 | Klotz, Jr. | G06F 16/35 |
| 9,892,208 B2 * | 2/2018 | Anastasakos | G06F 16/313 |
| 10,311,442 B1 * | 6/2019 | Lancaster | G06Q 30/00 |
| 10,320,633 B1 | 6/2019 | Wong et al. | |
| 10,380,489 B2 | 8/2019 | Ankisettipalli et al. | |
| 10,726,070 B2 * | 7/2020 | Sanchez | G06Q 30/0277 |
| 11,080,336 B2 * | 8/2021 | Van Dusen | G06Q 50/01 |
| 2007/0206884 A1 | 9/2007 | Kato et al. | |
| 2009/0265299 A1 | 10/2009 | Hadad et al. | |
| 2010/0094878 A1 | 4/2010 | Soroca et al. | |
| 2010/0318537 A1 | 12/2010 | Surendran et al. | |
| 2011/0252049 A1 | 10/2011 | Marinescu et al. | |
| 2013/0226846 A1 * | 8/2013 | Li | G06F 40/295 |
| | | | 706/12 |
| 2013/0290226 A1 | 10/2013 | Dokken | |
| 2015/0142704 A1 | 5/2015 | London | |
| 2015/0286747 A1 * | 10/2015 | Anastasakos | G06F 16/3344 |
| | | | 707/776 |
| 2015/0370787 A1 | 12/2015 | Akbacak et al. | |
| 2016/0092447 A1 * | 3/2016 | Venkataraman | G06F 16/732 |
| | | | 707/765 |
| 2016/0103932 A1 | 4/2016 | Sathish et al. | |
| 2016/0179953 A1 * | 6/2016 | Klotz, Jr. | G06F 16/2455 |
| | | | 707/722 |
| 2016/0275196 A1 | 9/2016 | Lee et al. | |
| 2016/0292304 A1 | 10/2016 | Kartha et al. | |
| 2016/0378861 A1 | 12/2016 | Eledath et al. | |
| 2018/0069899 A1 | 3/2018 | Lang et al. | |
| 2018/0144053 A1 | 5/2018 | Ankisettipalli et al. | |
| 2018/0144257 A1 | 5/2018 | Ankisettipalli et al. | |
| 2018/0144424 A1 | 5/2018 | Sahu et al. | |
| 2019/0026372 A1 | 1/2019 | Lu et al. | |

OTHER PUBLICATIONS

"U.S. Appl. No. 15/451,912, Notice of Allowance dated Jun. 3, 2019", 8 pgs.

"U.S. Appl. No. 15/451,912, Response filed May 22, 2019 to Non Final Office Action dated Mar. 1, 2019", 14 pgs.

"European Application Serial No. 17001900.4, Extended European Search Report dated Mar. 13, 2018", 18 pgs.

Silverman, Barry, et al., "A Markov Decision Processing Solution to Natural Language Querying of Online e-Commerce Catalogs: The EQUIsearch Agent", [Online], Retrieved from the Internet: <URL: http://citeseerx.ist.psu.edu/viewdoc/download?doi=10.1.1.23.5757 &rep=rep1&type=pdf>, (Feb. 2001), 1-24.

Waltz, David, "An English Language Question Answering System for a Large Relational Database", Communications of the ACM, Association for Computing Machinery, Inc., vol. 21, No. 7, (Jul. 1978), 526-539.

"U.S. Appl. No. 15/451,879, Final Office Action dated Dec. 14, 2020", 43 pgs.

"U.S. Appl. No. 15/451,879, Non Final Office Action dated Jul. 24, 2020", 46 pgs.

"U.S. Appl. No. 15/451,879, Response filed Oct. 13, 2020 to Non Final Office Action dated Jul. 24, 2020", 13 pgs.

Neven, et al., "Extensions of Attribute Grammars for Structured Document Queries", DBPL'99, (2000), 99-117.

* cited by examiner

COGNITIVE ENTERPRISE SYSTEM

CROSS-REFERENCE TO RELATED APPLICATIONS

This application is a continuation of U.S. application Ser. No. 15/451,912 filed on Mar. 7, 2017, now issued U.S. Pat. No. 10,380,489, which claims the benefit of U.S. Provisional Application No. 62/424,952, filed Nov. 21, 2016, entitled "COGNITIVE ENTERPRISE," which applications are incorporated herein by reference in their entirety.

BACKGROUND

An enterprise resource planning (ERP) system may provide integrated applications and technology to automate many back office functions related to technology, services, human resources, and the like. For example, ERP software may integrate various functions of an operation, such as product planning, development, manufacturing, sales, and marketing, in a database application and user interface. Accordingly, an ERP system may have a functionally heavy interface against millions of user entries.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to cognitive enterprise systems and methods. As explained above, an ERP system may have a functionally heavy interface against millions of user entries. Embodiments described herein enable ERP to be cognitive, which simplifies user interactions in a natural way and breaks down complexity in accessing information for data driven decisions. Moreover, embodiments described herein provide for contextual insights and intelligence processes to bring an end-to-end process beyond ERP to Bot or virtual assistant users. In example embodiments, the system learns from user interactions and contextual data to enable and define new business processes and also help make applications (also referred to herein as "apps") proactive.

Conversational applications are considered the next user interface (UI) paradigm after web and mobile. New chat bot technologies are starting to become more prevalent and many entities are evaluating or providing chat bots. Chat bot is a technology service that allows a user to interface via a chat interface. A chat bot may be powered by rules, artificial intelligence, and other technologies. There has also been significant research in natural language processing and understanding using machine learning and artificial intelligence, which may be used to develop conversational UIs for users. Moreover, smart phones have raised implicit expectations for applications to be proactive, such as suggesting a best route based on learnings of individual travel patterns.

Embodiments described herein relate to cognitive enterprise systems and methods to address the enterprise domain and fixed knowledge space. Interactions, business implementations, and operations may be flexible and complex. Also data may be structured, semi-structured, and unstructured.

Chat bots may allow users to interact with enterprise systems in a natural way. There may be a place for conversational apps apart from web and mobile applications. Example embodiments may make it easy to perform automatic processes in simulated conversations. For example, by using advances in machine learning and enabling productive apps, regular work may be easy to perform and productivity increased.

Example embodiments may capture an intent from a natural language question and map the intent to ERP domain objects based on semantic information and data elements. Example embodiments may also build a dynamic knowledge graph for responses to answer relational questions beyond schema definition. Analysis and questions and answers may be performed on semi-structured data.

Figure 1:
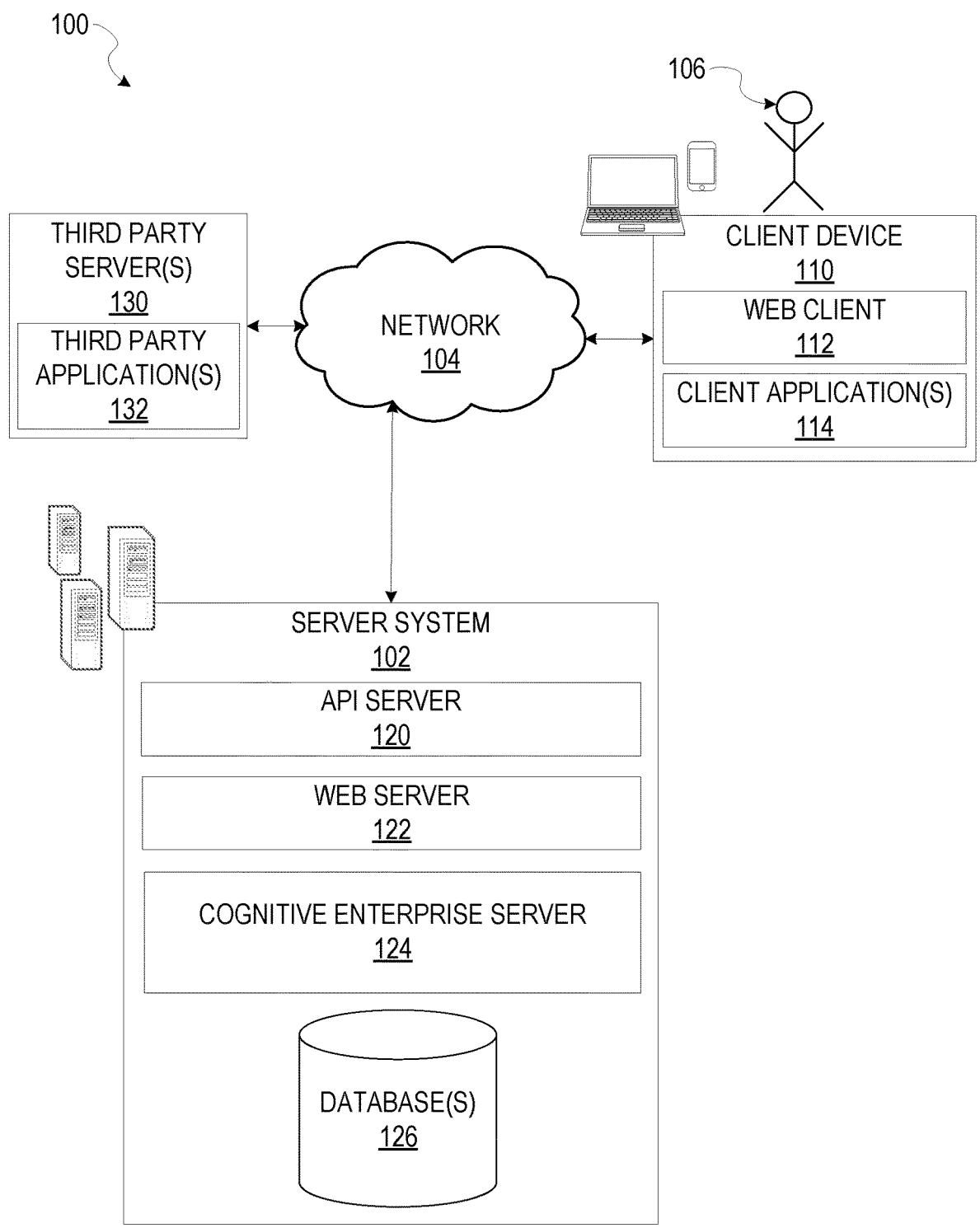
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, Ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to create or generate queries.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110, and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, a cognitive enterprise application, and the like.

In some embodiments, one or more client applications 114 may be included in a given one of the client devices 110, and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., access ERP data, process user queries, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may include an application program interface (API) server 120, a web server 122, and a cognitive enterprise server 124, which may be communicatively coupled with one or more databases 126.

The one or more databases 126 may be storage devices that store ERP system-related data, user data, and other data. The one or more databases 126 may further store information related to third party servers 130, third party applications 132, client devices 110, client applications 114, users 106, and so forth. The one or more databases 126 may include cloud-based storage.

The server system 102 may be a cloud computing environment, according to some example embodiments. The server system 102, and any servers associated with the server system 102, may be associated with a cloud-based application, in one example embodiment.

The cognitive enterprise server 124 may provide back-end support for third-party applications 132 and client applications 114, which may include cloud-based applications. In one embodiment, the cognitive enterprise server 124 may receive queries generated by users and process the queries to generate a response to the queries.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more the third party applications 132 may request and utilize information from the server system 102 via the API server 120 to support one or more features or functions on a web site hosted by the third party or an application hosted by the third party. The third party website or application 132, for example, may provide cognitive enterprise functionality that is supported by relevant functionality and data in the server system 102.

Figure 2:
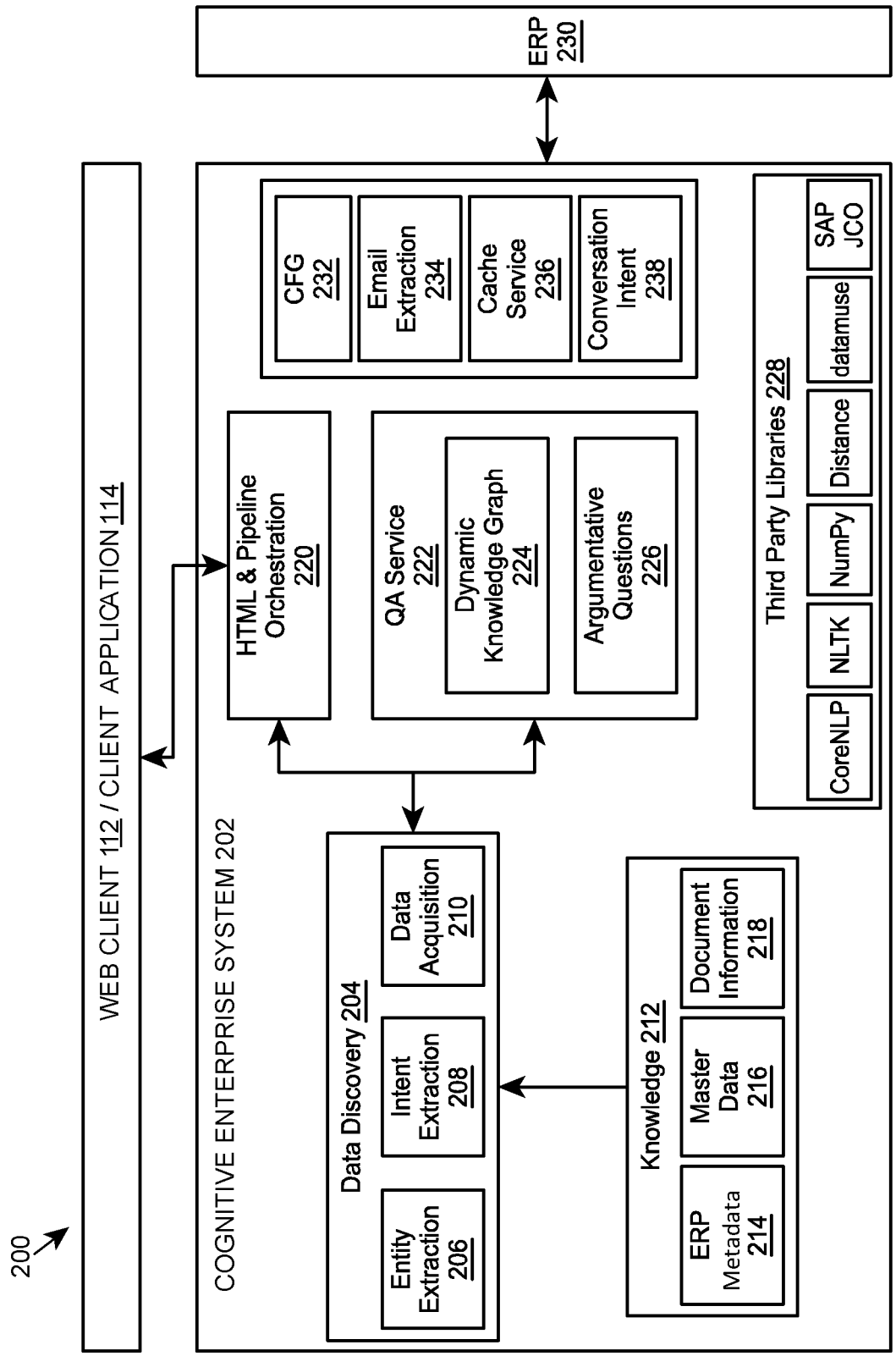
FIG. 2 is a block diagram illustrating the building blocks of a cognitive enterprise system, according to some example embodiments.

FIG. 2 is a block diagram illustrating building blocks 200 of a cognitive enterprise system 202, according to some example embodiments. In one example, the server system 102 of FIG. 1 may be a cognitive enterprise system 202. In another example, the cognitive enterprise system 202 may be part of the server system 102.

FIG. 2 shows a web client 112/client application 114 that may interact (e.g., via client device 110) with the cognitive enterprise system 202. The cognitive enterprise system 202 may further interact with an ERP system 230 or other enterprise system, in this example.

The cognitive enterprise system 202 may comprise a data discovery module 204 that may comprise several modules, such as, an entity extraction module 206, an intent extraction module 208, and a data acquisition module 210. The cognitive enterprise system 202 may further comprise a knowledge module 212 that may comprise several modules, such as ERP metadata module 214, master data module 216, and document information module 218. ERP metadata may comprise metadata from an ERP system (e.g., ERP system 230). Master data may comprise data from a plurality of entities (e.g., customers) such as products sold by the entity, names and other information related to the entity, products procured by the entity, organizations and people within the entity, and so forth. Document information may comprise various documents created by an entity or other party to the enterprise system 202, such as invoices, purchase orders, and so forth. The knowledge module 212, or knowledge data source, may contain metadata information from ERP system(s), metadata from master data from a plurality of entities, and metadata from various documents. This knowledge data source or knowledge module 212 may be used for data discovery (e.g., by data discovery module 204).

Figure 3:
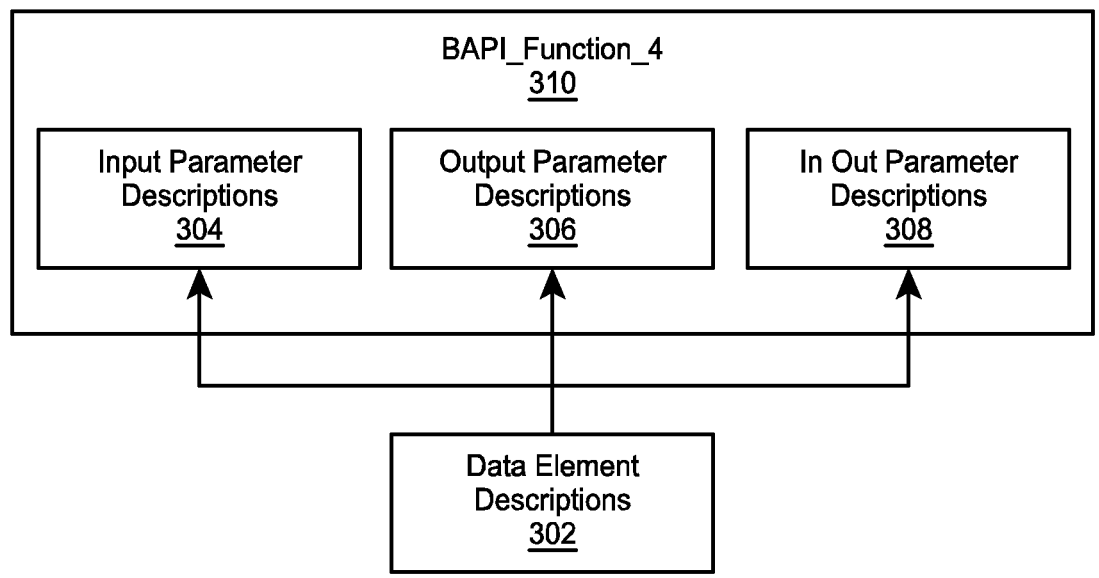
FIG. 3 is a block diagram illustrating data discovery and knowledge, according to some example embodiments.

The knowledge data source or knowledge module 212 may comprise data element descriptions 302, as shown in FIG. 3. The data element descriptions 302 may be used to determine input parameter descriptions 304, output parameter descriptions 306, and in out parameter descriptions 308. This information may be use to map to a particular function, such as BAPI_Function_4 310. BAPI is an example of one functional interface with metadata. It is understood that other functional interfaces may be used according to some example embodiments. For example, service consumption (e.g., REST APIs) with metadata that describes the relationships may also, or in the alternative, be used, according to some example embodiments.

Returning to FIG. 2, the enterprise system 202 may further comprise a hypertext markup language (HTML) and pipeline orchestration 220 and a question and answer (QA) Service 222. The QA server may comprise several modules, such as a dynamic knowledge graph module 224 and an argumentative questions module 226. The enterprise system 202 may further comprise third party libraries 228 and a content free grammar (CFG) module 232, an email extraction module 234, a cache service module 236, and a conversation intent module 238.

Figure 4:
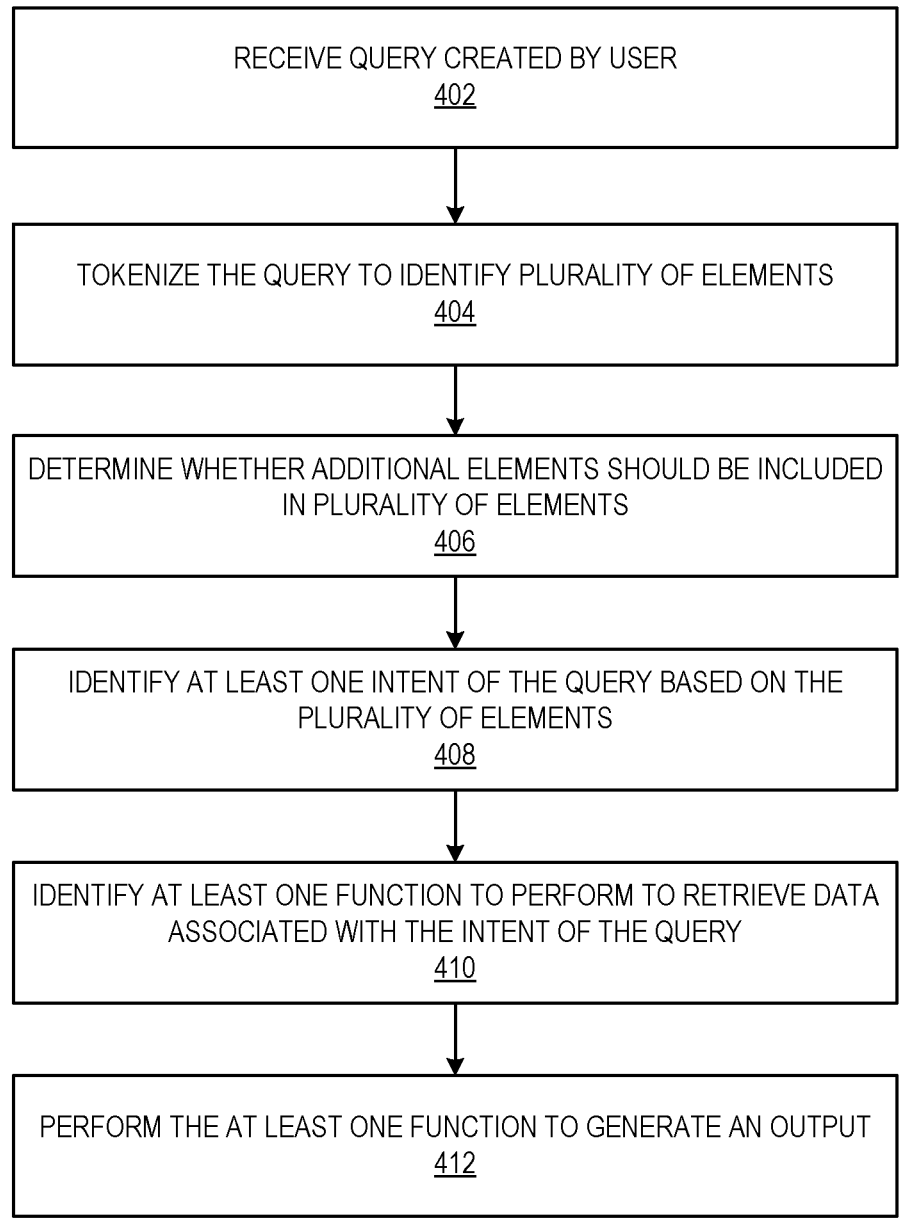
FIG. 4 is a flow chart illustrating aspects of a method, according to some example embodiments, for dynamic intent capturing.

FIG. 4 is a flow chart illustrating aspects of a method 400, according to some example embodiments, for processing a query created by a user. For illustrative purposes, method 400 is described with respect to the networked system 100 of FIG. 1. It is to be understood that method 400 may be practiced with other system configurations in other embodiments.

Figure 5:
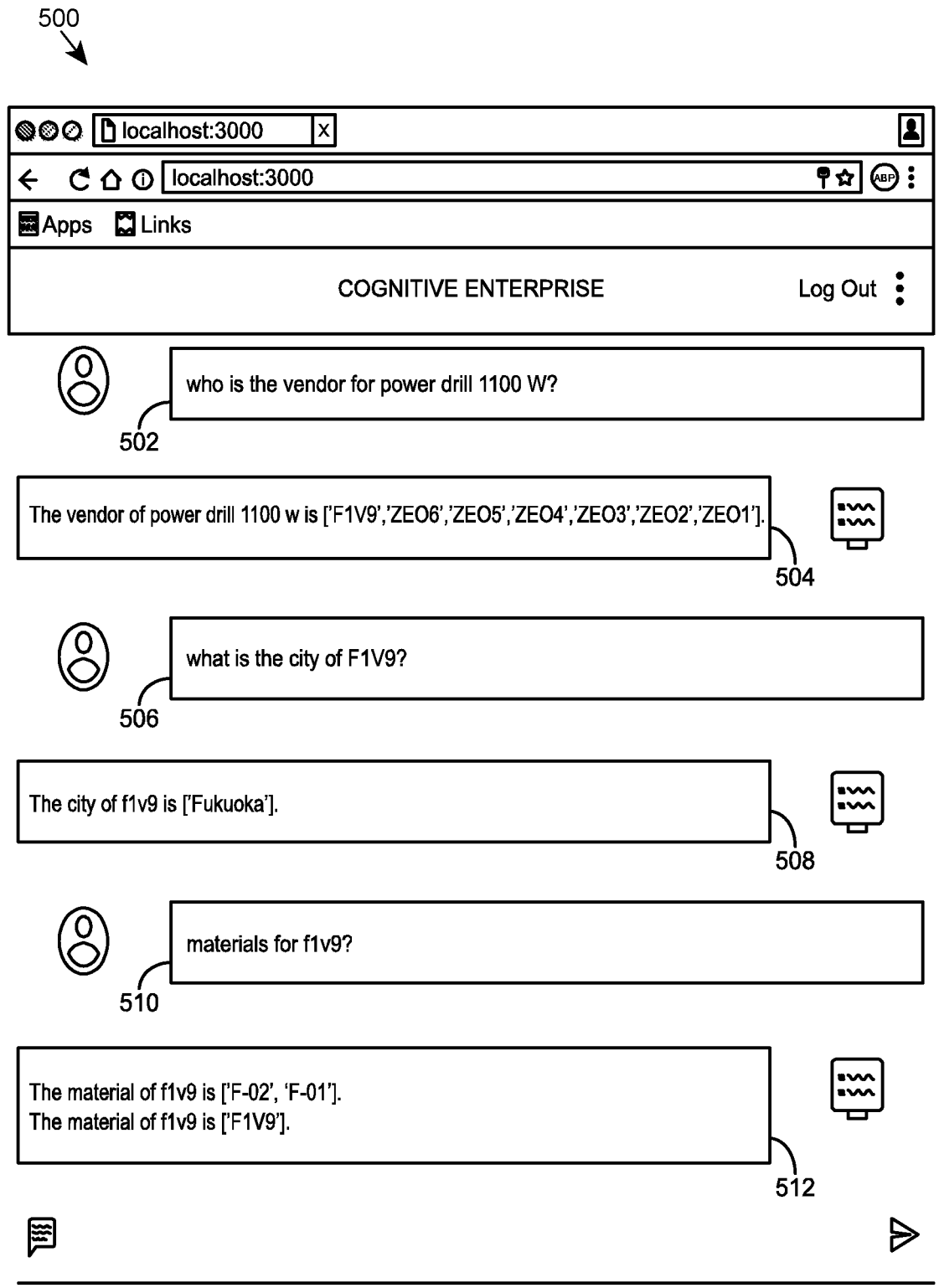
FIG. 5 illustrates an example a user interface for a cognitive enterprise system, according to some example embodiments.

In operation 402, a server system 102 (e.g., via cognitive enterprise server 124) receives a query created by a user. For example, a user 106 may use a client device 110 to access an application input a query (e.g., via voice, text, or other means) requesting particular information about a product, entity, purchase order, and so forth. FIG. 5 illustrates an example a user interface 500 for a cognitive enterprise system, according to some example embodiments. In this example, a user is asking a number of questions (502, 506, and 510) about a power drill and the server system 102 is calculating an answer and returning the answer to be displayed to the user (e.g., 504, 508, 512). For example, the user may input a query 502 that includes "who is the vendor for power drill 1100 W?" and the server system 102 (e.g., via cognitive enterprise server 124) may process the query to generate a response 504 that includes "The vendor of power drill 1100 w is F1V9, ZE06, ZE05, ZE04, ZE03, ZE02, ZE01." The user may input follow up queries such as query 506 asking the location of vendor F1V9 and query 510 asking about materials for vendor F1V9. The cognitive enterprise server 124 may process each of these queries and generate responses 508 and 512, as described below.

Referring again to FIG. 4, in operation 404, the cognitive enterprise server 124 analyzes the query to identify a plurality of elements for the query using a knowledge data source.

An enterprise domain may comprise of various modules that enable business processes, such as customer relations, procurements, and so forth. The enterprise domain artifacts may comprise of data elements with descriptions, objects that use instances of data elements with extended purposes, and relationships among these objects. These artifacts are ultimately used in business processes. In some example embodiments, these relations have been defined over years and example embodiments uniquely use these artifacts as one example in a knowledge data source for understanding a query intent.

In one example, the cognitive enterprise server 124 may tokenize the query to identify a plurality of elements for the query using a knowledge data source. Using the example query "who are the vendors for power drill 1100 watts," the cognitive enterprise server 124 would access the knowledge data source to identify "vendor" as an element and "power drill 1100 watts" as an element. Other example elements may include a purchase order identifier, a location (e.g., city, state, address, etc.), an invoice identifier, a vendor name, a vendor identifier, and so forth.

The cognitive enterprise server 124 may then determine, using the knowledge data source, an element type for each element. For example, the element "vendor" may be a vendor type, and the element "power drill 1100 watts" may be a product or material type. Each element type may be associated with an object that comprises various attributes that describes the object. Some other examples of objects may include a purchase order object, a location object, and so forth. For example, a purchase order object may comprise various attributes related to a purchase order, such as a purchase order unique identifier, order date, items (e.g., products, materials, etc.) for the purchase order, and so forth. A location object may include various attributes related to a location, such as a street address, a city, a state, a country, and so forth. Accordingly, the cognitive enterprise server 124 may determine a plurality of elements and their associated attributes. For example, using the element "power drill 1100 watts," the cognitive enterprise server 124 may determine this element is a product and, thus, what attributes are associated with a product. The cognitive enterprise server 124 may use this to determine other elements in the query.

During the tokenization process, the cognitive enterprise server 124 may correct the spelling of the elements in the query. For example, if the word "vendor" is spelled wrong, the cognitive enterprise server 124 may revise the element so that the spelling is correct. Also, the cognitive enterprise server 124 may determine one or more entities associated with the query. For example, the cognitive enterprise server 124 may determine an entity associated with the user, an entity associated with one or more of the plurality of elements (e.g., entity associated with a product or material identifier, etc.), and so forth. Accordingly, as part of the tokenization process, the cognitive enterprise server 124 identifies the tokens, corrects spelling, and enriches elements. These elements may be used to identify domain specific entities that may be used in functions/services. The cognitive enterprise server may also look at the similar words from sources such as dictionaries. Also, based on these entities the cognitive enterprise server 124 may identify relevant data for the query.

In operation 406, the cognitive enterprise server 124 determines whether additional elements should be included in the plurality of elements. In one example, a user 106 may input a word in a query that is not used in the knowledge data source. For example, the user may input the word "supplier" and the knowledge data source may use the word "vendor." In this example, the cognitive enterprise server 124 may determine that the term "supplier" is not in the knowledge data source (e.g., not in a dictionary of objects). The cognitive enterprise server 124 may determine like words to "supplier" (e.g., synonyms). The cognitive enterprise server 124 may search the knowledge data source for each of the synonyms to find one of the synonyms for the element. The cognitive enterprise server 124 may replace the element with the synonym in the plurality of elements. For example, the cognitive enterprise server 124 may replace "supplier" with "vendor."

In another example, the cognitive enterprise server 124 may use context-free grammar (CFG) rules to determine whether additional elements should be included in the plurality of elements. One example of a CFG rule may be a rule configured by a user or entity. For example, a user may enter a query for a best vendor for a particular product. There may be multiple ways to calculate a best vendor. For example, a vendor may be best if it provides a good lead time, has an advantageous price, based on a minimum order quantity or on price per unit, and so forth. A user or entity may configure a CFG rule to define best vendor as the vendor that provides the best lead time. Thus, the cognitive enterprise server 124 may determine that vendor lead time should be included as an element in the plurality of elements, based on the CFG rule for best vendor for that user or the entity associated with that user. The server system 102 may, in addition or in the alternative, generate default CFG rules in the event that there is no user or entity defined CFG rule for various scenarios. For example, a default rule may be defined for best vendor as the vendor with the best price per unit. If the cognitive enterprise server 124 determines that at least one additional element should be included in the plurality of elements, the cognitive enterprise server 124 may add the at least one additional element to the plurality of elements.

In operation 408, the cognitive enterprise server 124 identifies at least one intent of the query based on the plurality of elements. In one example, identifying at least one intent of the query based on the plurality of elements comprises determining at least one input parameter from the plurality of elements and determining at least one output parameter from the plurality of elements. Using the example query "who are the vendors for power drill 1100 watts," the cognitive enterprise server 124 would determine that "power drill 1100 watts" is an input parameter (e.g., data provided by the user) and "vendors" is an output parameter (e.g., an output desired by the user). Input parameters may be various terms provided in the query by the user and any additional elements added to the query. Output parameters may be various terms provided in the query by the user and any additional elements added to the query.

For each element of the plurality of elements, the cognitive enterprise server 124 may determine whether it is an input parameter or an output parameter. In one example, the knowledge data source may comprise input parameter descriptions and output parameter descriptions. The cognitive enterprise server 124 may access the knowledge data source to determine which elements are input parameters and which elements are output parameters.

In operation 410, the cognitive enterprise server 124 identifies at least one function to perform to retrieve data associated with the intent of the query. Using a simple example of product name as an input parameter and vendor name as an output parameter, the cognitive enterprise server 124 looks for a function that treats the product name or identifier as an input parameter and gives out the vendor name or identifier as an output parameter.

In one example, one or more lists or tables of functions may be stored in one or more databases 126. The cognitive enterprise server 124 may compare at least one input parameter and at least one output parameter from the plurality of elements to a list of functions to determine at least one function that has a function input parameter associated with the at least one input parameter and a function output parameter associated with the at least one output parameter. The cognitive enterprise server 124 may select a function that has a function input parameter associated with the at least one input parameter and a function output parameter associated with the at least one output parameter. The functions in the lists or tables may be services provided by an enterprise system, an entity, and so forth.

In determining the function or functions associated with the intent of the query, the cognitive enterprise server 124 may determine if there are additional parameters defined in the function. In one example, there may be user or entity defined parameters associated with a function or user that only allow a particular user access to a particular manufacturing plant's information. In this example, the cognitive enterprise server 124 may only look for functions with information associated with the particular manufacturing plant, and select a function with information associated with the particular manufacturing plant. In another example, the function may require additional parameters that the user did not provide or could not be determined from the query. In this example, the cognitive enterprise server 124 may look for an alternative function that does not require the unavailable additional parameters, and select the alternative function.

In operation 412, cognitive enterprise server 124 performs the at least one function to generate an output of the function. The output of the at least one function is data relevant to the intent of the query. This data may be output in the form of one or more tables. Using a simple example, a function with an input of a vendor identifier may output the vendor information (e.g., vendor name, address, etc.). In some embodiments, there may be multiple functions performed to obtain all of the data for the query. In some embodiments, there may be one or more tables comprising the output data for each of the functions performed.

Figure 6:
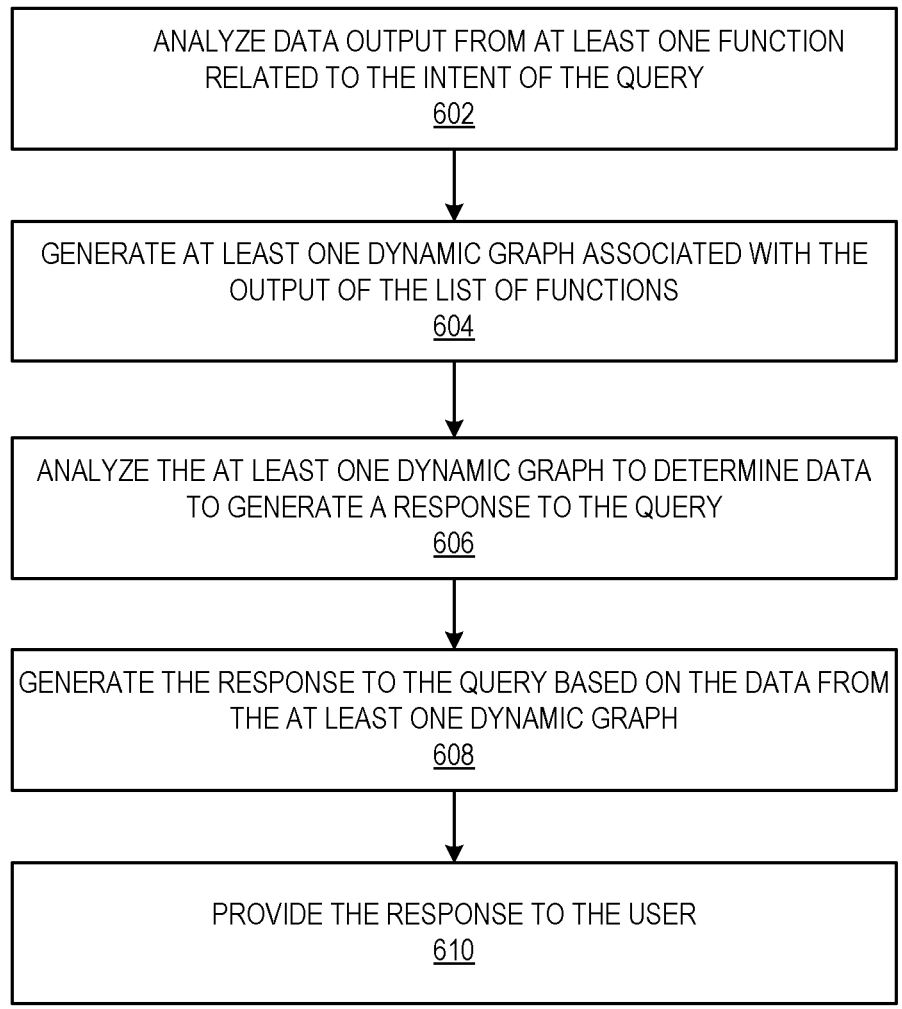
FIG. 6 is a flow chart illustrating aspects of a method, according to some example embodiments, for generating a dynamic knowledge graph.

The cognitive enterprise server 124 may next generate a response to the query based on the output of the function. In one embodiment, the cognitive enterprise server 124 generates one or more dynamic knowledge graphs comprising the data output by the one or more functions and uses the one or more dynamic knowledge graphs to generate a response to the query. FIG. 6 is a flow chart illustrating aspects of a method 600, according to some example embodiments, for generating a dynamic knowledge graph. For illustrative purposes, method 600 is described with respect to the networked system 100 of FIG. 1. It is to be understood that method 600 may be practiced with other system configurations in other embodiments.

Figure 7A:
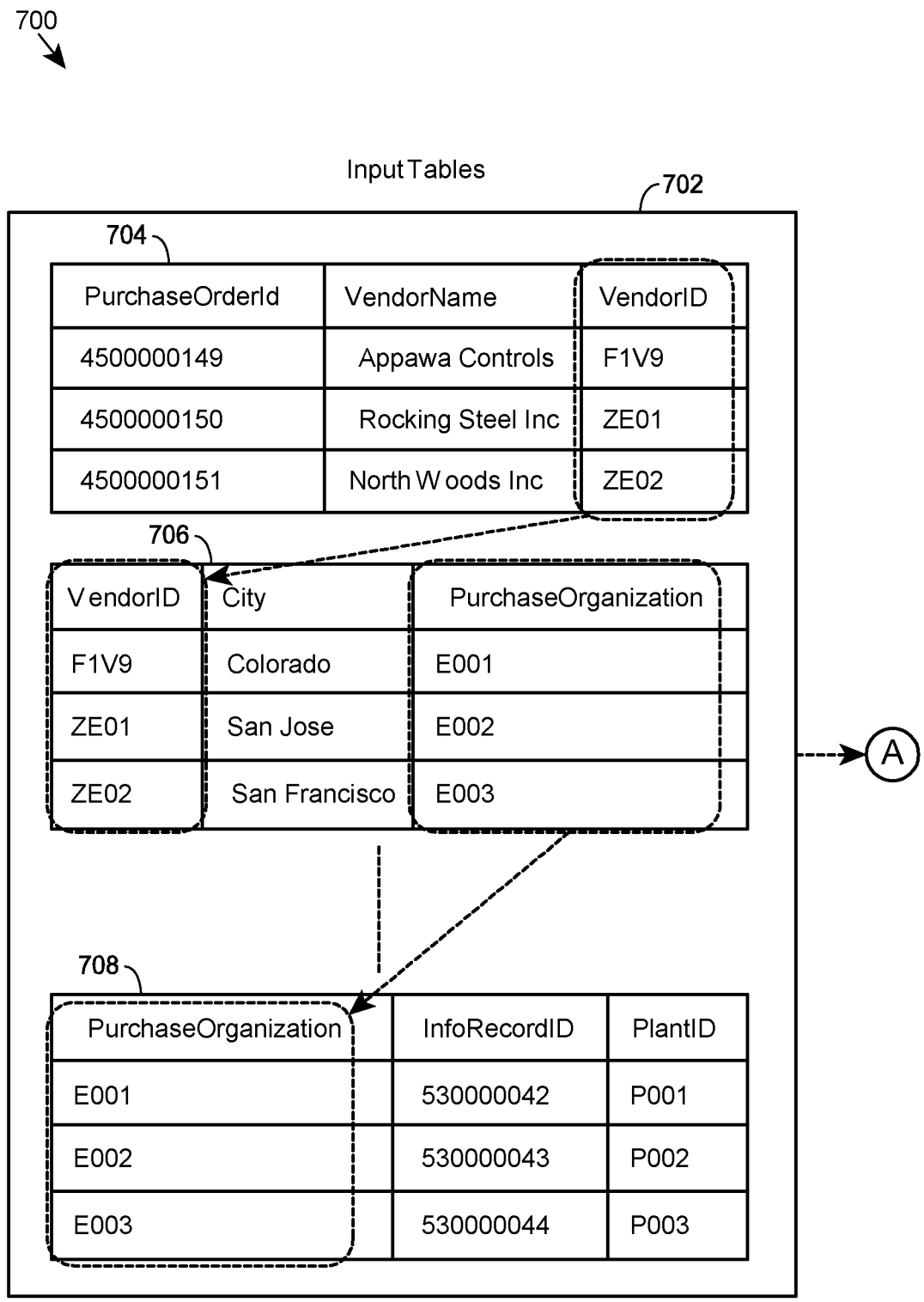
FIGS. 7A and 7B are a block diagram illustrating dynamic knowledge graph and query response generation, according to some example embodiments.
Figure 7B:
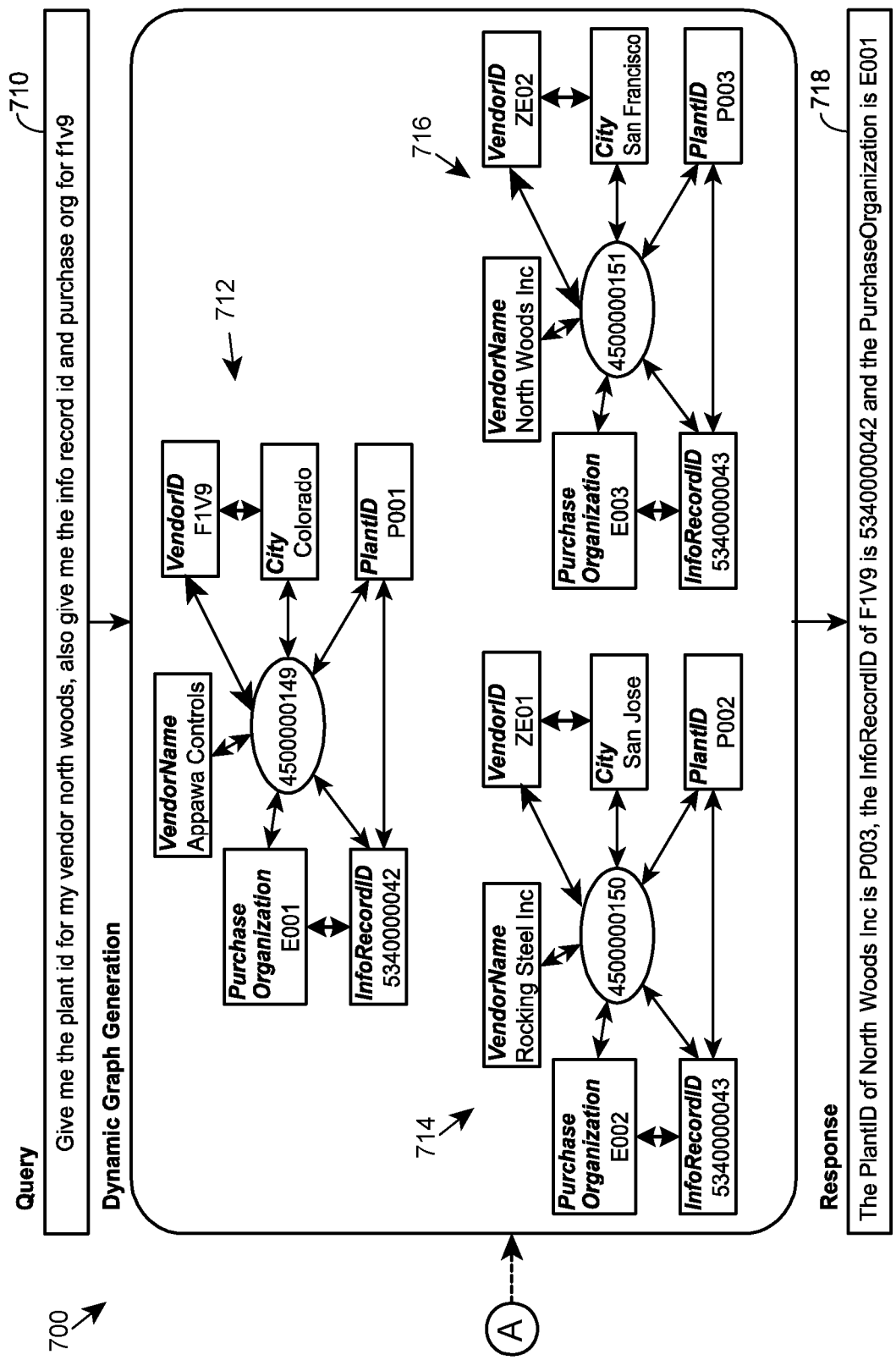

In operation 602, the cognitive enterprise server 124 analyzes the data output from the at least one function performed related to the intent of the query to generate one or more dynamic knowledge graphs, in operation 604. In one example, the output is in the form of a plurality of tables 702 as shown in FIG. 7A. FIGS. 7A and 7B comprise one diagram 700, but have been split into two figures for readability.

The example query 710 shown in FIG. 7B is "Give me the plan id for my vendor north woods, also give me the info record id and purchase org for flv9." The input elements in this example are vendor name north woods and flv9. The output elements in this example are plant identifier (ID), record ID, and purchase org. In one example, the plant ID may be known from a user or entity profile. Accordingly, the plant ID may be an input element instead of an output element. As an example, two functions may be performed to generate the output data in tables 702 (e.g., the input elements and output elements may be mapped to two different functions to get the data for the output elements). One example function may be BAPI_INFORECORD_GETLIST and another example function may be BAPI_PO_GETITEMS.

The tables 702 shown in FIG. 7A have been simplified and reduced to three example tables 704, 706, and 708 for purposes of illustration. The output from the at least one function may comprise many more tables, tables with many more rows and columns, fewer tables, and so forth.

In one example, there is no semantic relevance defined between the plurality of tables. Accordingly, the cognitive enterprise server 124 generates one or more knowledge graphs based on the tables with the entities and relationships between the entities. For example, the cognitive enterprise server 124 may generate dynamic knowledge graphs 712, 714, and 716, based on the tables 702.

Moreover, the data in the tables is normalized with respect to the type of data in the tables. For instance, the data may come from different sources with different naming conventions. In one example, one source may define a column as VendorID, another source may define the same column as Vendor Number, another Vendor Identifier, and so forth. The server system 102 may normalize the data with respect to all of the naming conventions so that even though different tables have different naming conventions, the naming conventions will be normalized to all refer to the same naming convention. For example, the table column will be VendorID even though the underlying naming conventions may be Vendor Number, Vendor Identifier, or other naming convention.

In one example, the dynamic knowledge graphs may be generated starting with a vendorID, as shown in table 704. For example, the cognitive enterprise server 124 may generate a first node of a dynamic knowledge graph with the vendor ID F1V9, as shown in the dynamic knowledge graph 712. The cognitive enterprise server 124 may then create a separate node for each element in the table 704, such as VendorName Appawa Controls and PurchaseOrderID 4500000149. The cognitive enterprise server 124 may then analyze the other tables to see what other data is relevant to the nodes already created. The cognitive enterprise server 124 may identify table 706 as having a VendorID column with the VendorID F1V9. The cognitive enterprise server 124 may then add data from table 706 as individual nodes to the dynamic knowledge graph. For example, the cognitive enterprise server 124 would add a node for City Colorado and PurchaseOrganization E001. In this way, each relevant element of each of the tables becomes a node in the dynamic knowledge graph. The arrows show the relationships between the nodes.

The cognitive enterprise server 124 may then analyze the other tables to see what other data is relevant to the nodes already created. The cognitive enterprise server 124 may identify table 708 as having a PurchaseOrganization column with the PurchaseOrganization E001. The cognitive enterprise server 124 may then add data from table 708 to the dynamic knowledge graph. For example, the cognitive enterprise server 124 would add a node for InfoRecordID 530000042 and PlantID P001. The cognitive enterprise server 124 may continue analyzing tables until there are no more tables with relevant data. The resulting dynamic knowledge graph for the above example is shown as dynamic knowledge graph 712.

The cognitive enterprise server 124 would generate knowledge graphs 714 and 716 in a similar manner as described above with respect to dynamic knowledge graph 712.

Returning to FIG. 6, in operation 606, the cognitive enterprise server 124 analyzes the at least one dynamic graph to determine data to generate a response to the query input by a user. For example, the cognitive enterprise server 124 pulls the plant ID from the dynamic knowledge graph 716 (the node with PlantID) and the record ID and purchase organization from the dynamic knowledge graph 712 to generate the response 718. In operation 608, the cognitive enterprise server 124 generates a response to the query based on the data from the at least one dynamic graph. The response is provided to a user 106, as shown in operation 610. For example, the response is provided to computing device (e.g., client 110) associated with a user 106, to be displayed to the user 106.

The dynamic knowledge graphs shown in FIG. 7B may then be used for additional queries generated by the user 106. Moreover, the dynamic knowledge graphs may be incrementally built with further queries and/or more dynamic knowledge graphs may be generated. This may continue while the context of the queries are similar or associated. Once the context of the queries changes, the graphs will be discarded and new graphs will be generated for the new query in the new context.

In one example, the cognitive enterprise server 124 generates dynamic knowledge graphs for a first query (as described above). The cognitive enterprise server 124 receives a second query and determines that the second query is in the same context of the first query and can either simply use the dynamic knowledge graphs generated for the first query, or can add to the graphs to fully answer the second query. The cognitive enterprise server 124 may continue this process until it determines that a query is not in the same context as the prior query. The dynamic knowledge graphs may be deleted once they are no longer needed (e.g., when a query is no longer in the same context as a prior query).

In one example, a query may have two elements. A first element may be an instance and a second element may be an attribute. For example, in the query "what is the vendor id of power drill 1100 w," power drill 1100 w may be the instance and vendor id may be the attribute. For this query, these are saved in a dynamic knowledge graph. If in the following query, one of these elements is missing, the system may obtain the context from the previous memory state saved.

To search through and pull information through an entire information space to get data for a response to a query would require significant footprint and be incredibly time consuming. Generating and utilizing a dynamic knowledge graph instead is extremely fast and takes less storage space and processing power. The specific data necessary is generated and then the knowledge graphs are created dynamically. This results in a more efficient system because of less storage and processing requirements and a faster response to queries.

Example embodiments of the cognitive enterprise systems may provide for systems and methods for conversational interaction, context, personalization, cognitive functionality, and simplification. Example embodiments may provide for intent capturing from a natural language question to ERP domain objects based on semantic information and data elements, building a dynamic knowledge graph for responses to answer relational questions beyond schema definition, and QA on semi-structured data.

Figure 8:
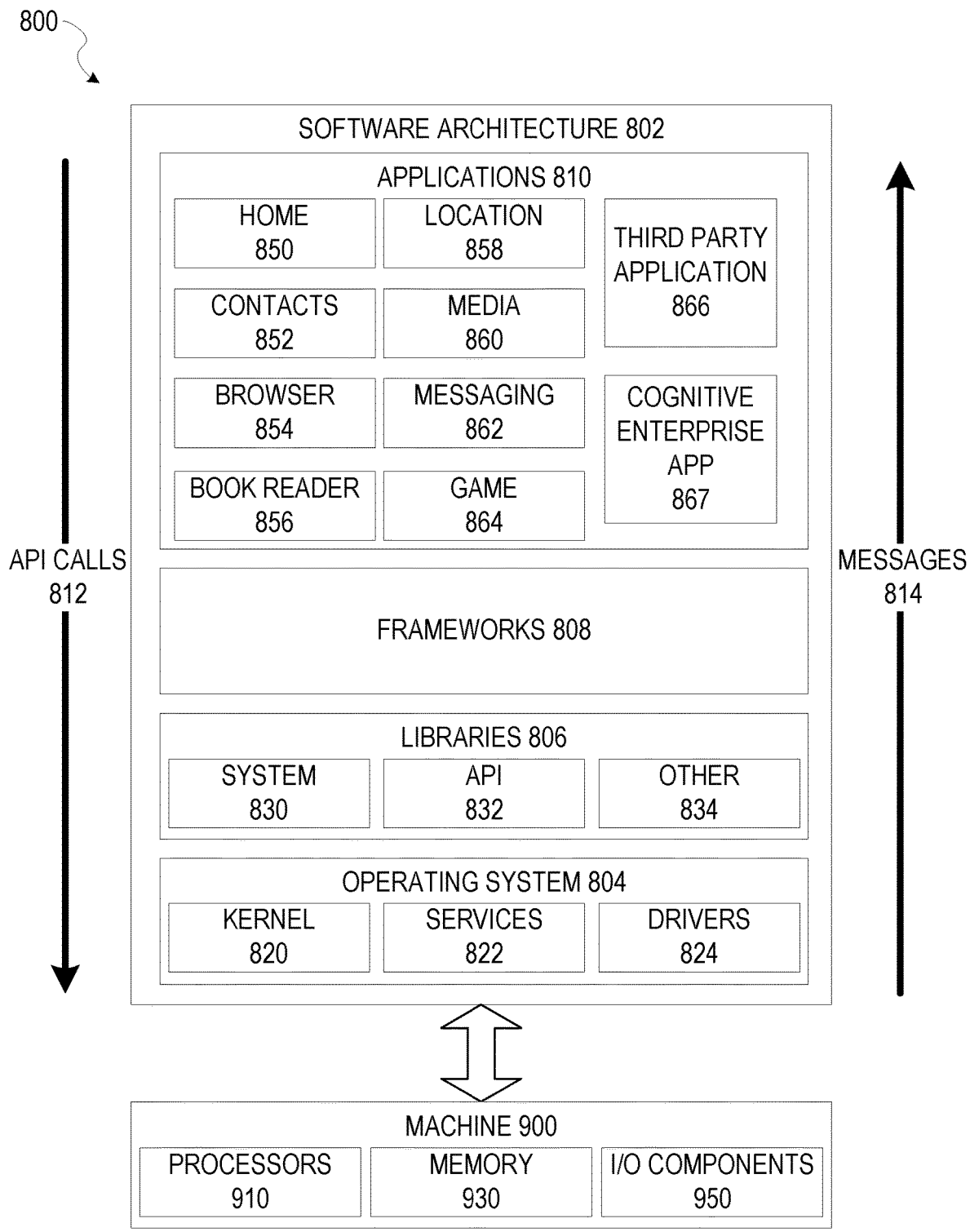
FIG. 8 is a block diagram illustrating an example of a software architecture that may be installed on a machine, according to some example embodiments.

FIG. 8 is a block diagram 800 illustrating software architecture 802, which can be installed on any one or more of the devices described above. For example, in various embodiments, client devices 110 and server systems 130, 102, 120, 122, and 124 may be implemented using some or all of the elements of software architecture 802. FIG. 8 is merely a non-limiting example of a software architecture, and it will be appreciated that many other architectures can be implemented to facilitate the functionality described herein. In various embodiments, the software architecture 802 is implemented by hardware such as machine 900 of FIG. 9 that includes processors 910, memory 930, and I/O components 950. In this example, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications such as a third party applications 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 866 can invoke the API calls 812 provided by the operating system 804 to facilitate functionality described herein.

Some embodiments may particularly include a cognitive enterprise application 867. In certain embodiments, this may be a stand-alone application that operates to manage communications with a server system such as third party servers 130 or server system 102. In other embodiments, this functionality may be integrated with another application. The cognitive enterprise application 867 may request and display various data related to ERP or other system and may provide the capability for a user 106 to input data related to the system via a touch interface, keyboard, or using a camera device of machine 900, communication with a server system via I/O components 950, and receipt and storage of object data in memory 930. Presentation of information and user inputs associated with the information may be managed by software version analysis application 867 using different frameworks 808, library 806 elements, or operating system 804 elements operating on a machine 1300.

The following examples describe various embodiments of methods, machine-readable media, and systems (e.g., machines, devices, or other apparatus) discussed herein.

Example 1. A method comprising:
receiving, at a server computer, a query created by a user;
receiving, at the server computer, output data of at least one function to retrieve data related to the query;
analyzing, by the one or more hardware processors of the server computer, the output data of the at least one function to retrieve data related to the query;
generating, by the one or more hardware processors of the server computer, at least one dynamic knowledge graph associated with the output data of the at least one function, wherein the at least one dynamic knowledge graph comprises data from the output data of the at least one function and indicates relationships between the data;
analyzing, by the one or more hardware processors of the server computer, the at least one dynamic knowledge graph to determine data relevant to the query generated by the user;
generating, by the one or more hardware processors of the server computer, a response to the query based on the data relevant in the at least one dynamic knowledge graph; and
providing, by the one or more hardware processors of the server computer, the response to the input query to a computing device associated with the user.

Example 2. A method according to any of the previous examples, wherein the query created by the user is a first query, and the method further comprising:
receiving a second query created by the user;
analyzing the query to determine that the query is in a same context of the first query;
analyzing the at least one dynamic knowledge graph to determine data relevant to the query generated by the user;
generating a response to the query based on the data relevant in the at least one dynamic knowledge graph; and
providing the response to the input query to a computing device associated with the user.

Example 3. A method according to any of the previous examples, wherein the query created by the user is a first query, and the method further comprising:
receiving a second query created by the user;
analyzing the query to determine that the query is in a same context of the first query;

analyzing the at least one dynamic knowledge graph to determine data relevant to the query generated by the user;

determining additional data for a response to the query that is not included in the at least one dynamic knowledge graph;

incrementing the at least one dynamic knowledge graph to include the additional data needed for a response to the query based on output data from at least one additional function;

generating a response to the query based on the data in the at least one dynamic knowledge graph that has been incremented to include the additional data needed for a response to the query based on output data from at least one additional function; and providing the response to the input query to a computing device associated with the user.

Example 4. A method according to any of the previous examples, wherein the query created by the user is a first query, and the method further comprising:

receiving a second query created by the user;

analyzing the query to determine that the query is not in a same context of the first query; and discarding the at least one dynamic knowledge graph.

Example 5. A method according to any of the previous examples, wherein output data of at least one function to retrieve data related to the query is in the form of one or more tables.

Example 6. A method according to any of the previous examples, wherein there is no semantic relevance defined between the plurality of tables.

Example 7. A method according to any of the previous examples, wherein data from the output data of the at least one function is represented as nodes in the dynamic knowledge graph.

Example 8. A method according to any of the previous examples, wherein the query is created by a user in an enterprise resource planning (ERP) system.

Example 9. A server computer comprising:

one or more hardware processors; and a computer-readable medium coupled with the one or more hardware processors, the computer-readable medium comprising instructions stored thereon that are executable by the one or more hardware processors to cause the server computer to perform operations comprising:

receiving a query created by a user;

receiving output data of at least one function to retrieve data related to the query;

analyzing the output data of the at least one function to retrieve data related to the query;

generating at least one dynamic knowledge graph associated with the output data of the at least one function, wherein the at least one dynamic knowledge graph comprises data from the output data of the at least one function and indicates relationships between the data;

analyzing the at least one dynamic knowledge graph to determine data relevant to the query generated by the user;

generating a response to the query based on the data relevant in the at least one dynamic knowledge graph; and providing the response to the input query to a computing device associated with the user.

Example 10. A server computer according to any of the previous examples, wherein the query created by the user is a first query, and the operations further comprising:

receiving a second query created by the user;

analyzing the query to determine that the query is in a same context of the first query;

analyzing the at least one dynamic knowledge graph to determine data relevant to the query generated by the user;

generating a response to the query based on the data relevant in the at least one dynamic knowledge graph; and providing the response to the input query to a computing device associated with the user.

Example 11. A server computer according to any of the previous examples, wherein the query created by the user is a first query, and the operations further comprising:

receiving a second query created by the user;

analyzing the query to determine that the query is in a same context of the first query;

analyzing the at least one dynamic knowledge graph to determine data relevant to the query generated by the user;

determining additional data for a response to the query that is not included in the at least one dynamic knowledge graph;

incrementing the at least one dynamic knowledge graph to include the additional data needed for a response to the query based on output data from at least one additional function;

generating a response to the query based on the data in the at least one dynamic knowledge graph that has been incremented to include the additional data needed for a response to the query based on output data from at least one additional function; and providing the response to the input query to a computing device associated with the user.

Example 12. A server computer according to any of the previous examples, wherein the query created by the user is a first query, and the operations further comprising:

receiving a second query created by the user;

analyzing the query to determine that the query is not in a same context of the first query; and discarding the at least one dynamic knowledge graph.

Example 13. A server computer according to any of the previous examples, wherein output data of at least one function to retrieve data related to the query is in the form of one or more tables.

Example 14. A server computer according to any of the previous examples, wherein there is no semantic relevance defined between the plurality of tables.

Example 15. A server computer according to any of the previous examples, wherein data from the output data of the at least one function is represented as nodes in the dynamic knowledge graph.

Example 16. A server computer according to any of the previous examples, wherein the query is created by a user in an enterprise resource planning (ERP) system.

Example 17. A non-transitory computer-readable medium comprising instructions stored thereon that are executable by at least one processor to cause a computing device to perform operations comprising:

receiving a query created by a user;

receiving output data of at least one function to retrieve data related to the query;

analyzing the output data of the at least one function to retrieve data related to the query;

generating at least one dynamic knowledge graph associated with the output data of the at least one function, wherein the at least one dynamic knowledge graph comprises data from the output data of the at least one function and indicates relationships between the data;

analyzing the at least one dynamic knowledge graph to determine data relevant to the query generated by the user;

generating a response to the query based on the data relevant in the at least one dynamic knowledge graph; and providing the response to the input query to a computing device associated with the user.

Example 18. A non-transitory computer-readable medium according to any of the previous examples, wherein the query created by the user is a first query, and the operations further comprising:

receiving a second query created by the user;

analyzing the query to determine that the query is in a same context of the first query;

analyzing the at least one dynamic knowledge graph to determine data relevant to the query generated by the user;

generating a response to the query based on the data relevant in the at least one dynamic knowledge graph; and providing the response to the input query to a computing device associated with the user.

Example 19. A non-transitory computer-readable medium according to any of the previous examples, wherein the query created by the user is a first query, and the operations further comprising:

receiving a second query created by the user;

analyzing the query to determine that the query is in a same context of the first query;

analyzing the at least one dynamic knowledge graph to determine data relevant to the query generated by the user;

determining additional data for a response to the query that is not included in the at least one dynamic knowledge graph;

incrementing the at least one dynamic knowledge graph to include the additional data needed for a response to the query based on output data from at least one additional function;

generating a response to the query based on the data in the at least one dynamic knowledge graph that has been incremented to include the additional data needed for a response to the query based on output data from at least one additional function; and providing the response to the input query to a computing device associated with the user.

Example 20. A non-transitory computer-readable medium according to any of the previous examples, wherein the query created by the user is a first query, and the operations further comprising:

receiving a second query created by the user;

analyzing the query to determine that the query is not in a same context of the first query; and discarding the at least one dynamic knowledge graph.

Figure 9:
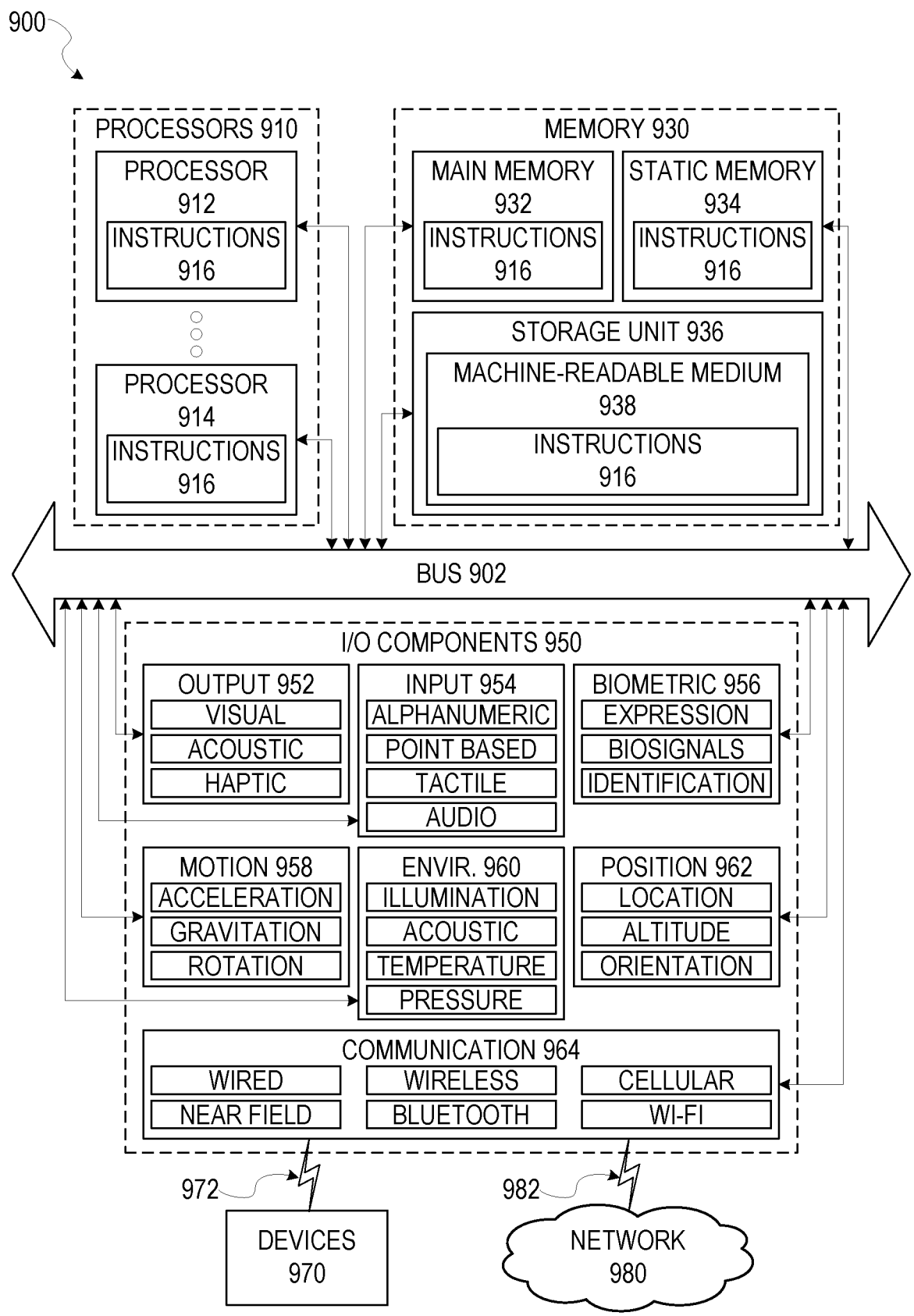
FIG. 9 illustrates a diagrammatic representation of a machine, in the form of a computer system, within which a set of instructions may be executed for causing the machine to perform any one or more of the methodologies discussed herein, according to an example embodiment.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 130, 102, 120, 122, 124, and the like, or a client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 9 shows multiple processors 910, the machine 900 may include a single processor 910 with a single core, a single processor 910 with multiple cores (e.g., a multi-core processor 910), multiple processors 912, 914 with a single core, multiple processors 912, 914 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO)

technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

receiving, by one or more hardware processors of a server computer, a first query created by a user;

retrieving data associated with an intent of the first query, the data comprising a plurality of tables comprising output data related to the first query;

analyzing, by the one or more processors of the server computer, a first table of the plurality of tables to generate a first node of a dynamic knowledge graph, the first node comprising a first data type and the dynamic knowledge graph indicating relationships between nodes of the dynamic knowledge graph;

generating, by the one or more processors of the server computer, a separate node of the dynamic knowledge graph for each element in the first table corresponding to the first data type;

for each table of the plurality of tables except for the first table:

analyzing the table to determine whether the table comprises a data type corresponding to a previously generated node in the dynamic knowledge graph;

based on determining that the table comprises a data type corresponding to previously generated node in the dynamic knowledge graph, generating a separate node for each element in the table corresponding to the data type of the previously generated node in the dynamic knowledge graph;

generating, by the one or more hardware processors of the server computer, a response to the first query based on the data relevant in the dynamic knowledge graph;

receiving, by the one or more hardware processors of the server computer, a second query created by the user;

analyzing, by the one or more hardware processors of the server computer, the second query to determine that the second query is in a same context of the first query; and generating, by the one or more hardware processors of the server computer, a response to the second query based on the data relevant in the dynamic knowledge graph.

2. The method of claim 1, further comprising:
providing the response to the first query and the response to the second query to a computing device associated with the user.

3. The method of claim 1, wherein before generating the response to the second query, the method comprises:
analyzing the dynamic knowledge graph to determine data relevant to the second query;
determining additional data for a response to the second query that is not included in the dynamic knowledge graph;

incrementing the dynamic knowledge graph to include the additional data needed for a response to the second query based on output data from at least one additional table to generate an updated dynamic knowledge graph; and generating the response to the second query based on the data in the updated dynamic knowledge graph.

4. The method of claim 1, the method further comprising:
receiving a third query created by the user;
analyzing the third query to determine that the third query is in a new context that is not in a same context of the first query or the second query;
discarding the dynamic knowledge graph; and
generating a new dynamic knowledge graph for the third query in the new context.

5. The method of claim 1, wherein there is no semantic relevance defined between the plurality of tables.

6. The method of claim 1, wherein the dynamic knowledge graph is a first dynamic knowledge graph, and wherein the first node of the dynamic knowledge graph comprises a first data value of a first data type.

7. The method of claim 6, further comprising:
analyzing the first table of the plurality of tables to generate a first node of a second dynamic knowledge graph, the second node comprising a second data value of the first data type and the second dynamic knowledge graph indicating relationships between nodes of the second dynamic knowledge graph;
generating a separate node of the second dynamic knowledge graph for each element in the first table corresponding to the second data value of the first data type;
for each table of the plurality of tables except for the first table:
analyzing the table to determine whether the table comprises a data value corresponding to a previously generated node in the second dynamic knowledge graph; and
based on determining that the table comprises a data value corresponding to previously generated node in the second dynamic knowledge graph, generating a separate node for each element in the table corresponding to the data value of the previously generated node in the second dynamic knowledge graph.

8. The method of claim 7, wherein the server computer generates the response to the first query and the response to the second query based on the data relevant in the first dynamic knowledge graph and the second dynamic knowledge graph.

9. The method of claim 8, wherein the first dynamic knowledge graph and the second dynamic knowledge graph are discarded once a new query is received that is in a context different than the context of the first dynamic knowledge graph and the second dynamic knowledge graph.

10. A server computer comprising:
a memory that stores instructions; and
one or more processors configured by the instructions to perform operations comprising:
receiving a first query created by a user;
retrieving data associated with an intent of the first query, the data comprising a plurality of tables comprising output data related to the first query;
analyzing a first table of the plurality of tables to generate a first node of a dynamic knowledge graph, the first node comprising a first data type and the dynamic knowledge graph indicating relationships between nodes of the dynamic knowledge graph;
generating a separate node of the dynamic knowledge graph for each element in the first table corresponding to the first data type;
for each table of the plurality of tables except for the first table:
analyzing the table to determine whether the table comprises a data type corresponding to a previously generated node in the dynamic knowledge graph;
based on determining that the table comprises a data type corresponding to previously generated node in the dynamic knowledge graph, generating a separate node for each element in the table corresponding to the data type of the previously generated node in the dynamic knowledge graph;
generating a response to the first query based on the data relevant in the dynamic knowledge graph;
receiving a second query created by the user;
analyzing the second query to determine that the second query is in a same context of the first query; and
generating a response to the second query based on the data relevant in the dynamic knowledge graph.

11. The server computer of claim 10, the operations further comprising:
providing the response to the first query and the response to the second query to a computing device associated with the user.

12. The server computer of claim 10, wherein before generating the response to the second query, the operations comprise:
analyzing the dynamic knowledge graph to determine data relevant to the second query;
determining additional data for a response to the second query that is not included in the dynamic knowledge graph;
incrementing the dynamic knowledge graph to include the additional data needed for a response to the second query based on output data from at least one additional table to generate an updated dynamic knowledge graph; and
generating the response to the second query based on the data in the updated dynamic knowledge graph.

13. The server computer of claim 10, the operations further comprising:
receiving a third query created by the user;
analyzing the third query to determine that the third query is in a new context that is not in a same context of the first query or the second query;
discarding the dynamic knowledge graph; and
generating a new dynamic knowledge graph for the third query in the new context.

14. The server computer of claim 10, wherein there is no semantic relevance defined between the plurality of tables.

15. The server computer of claim 10, wherein the dynamic knowledge graph is a first dynamic knowledge graph, and wherein the first node of the dynamic knowledge graph comprises a first data value of a first data type.

16. The server computer of claim 15, the operations further comprising:
analyzing the first table of the plurality of tables to generate a first node of a second dynamic knowledge graph, the second node comprising a second data value of the first data type and the second dynamic knowledge graph indicating relationships between nodes of the second dynamic knowledge graph;
generating a separate node of the second dynamic knowledge graph for each element in the first table corresponding to the second data value of the first data type;

for each table of the other tables in the plurality of tables:
analyzing the table to determine whether the table comprises a data value corresponding to a previously generated node in the second dynamic knowledge graph; and based on determining that the table comprises a data value corresponding to previously generated node in the second dynamic knowledge graph, generating a separate node for each element in the table corresponding to the data value of the previously generated node in the second dynamic knowledge graph.

17. The server computer of claim 16, wherein the server computer generates the response to the first query and the response to the second query based on the data relevant in the first dynamic knowledge graph and the second dynamic knowledge graph.

18. The server computer of claim 17, wherein the first dynamic knowledge graph and the second dynamic knowledge graph are discarded once a new query is received that is in a context different than the context of the first dynamic knowledge graph and the second dynamic knowledge graph.

19. A non-transitory computer-readable medium comprising instructions stored thereon that are executable by at least one processor to cause a computing device to perform operations comprising:
receiving a first query created by a user;
retrieving data associated with an intent of the first query, the data comprising a plurality of tables comprising output data related to the first query;
analyzing a first table of the plurality of tables to generate a first node of a dynamic knowledge graph, the first node comprising a first data type and the dynamic knowledge graph indicating relationships between nodes of the dynamic knowledge graph;
generating a separate node of the dynamic knowledge graph for each element in the first table corresponding to the first data type;

for each table of the plurality of tables except for the first table:
analyzing the table to determine whether the table comprises a data type corresponding to a previously generated node in the dynamic knowledge graph;
based on determining that the table comprises a data type corresponding to previously generated node in the dynamic knowledge graph, generating a separate node for each element in the table corresponding to the data type of the previously generated node in the dynamic knowledge graph;
generating a response to the first query based on the data relevant in the dynamic knowledge graph;
receiving a second query created by the user;
analyzing the second query to determine that the second query is in a same context of the first query; and
generating a response to the second query based on the data relevant in the dynamic knowledge graph.

20. The non-transitory computer-readable medium of claim 19, wherein before generating the response to the second query, the operations comprise:
analyzing the dynamic knowledge graph to determine data relevant to the second query;
determining additional data for a response to the second query that is not included in the dynamic knowledge graph;
incrementing the dynamic knowledge graph to include the additional data needed for a response to the second query based on output data from at least one additional table to generate an updated dynamic knowledge graph; and
generating the response to the second query based on the data in the updated dynamic knowledge graph.

* * * * *